United States Patent
Zamer

(10) Patent No.: US 9,600,781 B2
(45) Date of Patent: Mar. 21, 2017

(54) ENHANCED SEAT SELECTION

(71) Applicant: STUBHUB, INC.

(72) Inventor: Kamal Zamer, Austin, TX (US)

(73) Assignee: EBAY INC., San Jose, CA (US)

(*) Notice: Subject to any disclaimer, the term of this patent is extended or adjusted under 35 U.S.C. 154(b) by 400 days.

(21) Appl. No.: 14/187,178

(22) Filed: Feb. 21, 2014

(65) Prior Publication Data

US 2015/0242763 A1  Aug. 27, 2015

(51) Int. Cl.
G06Q 10/00 (2012.01)
G06Q 10/02 (2012.01)
G07F 17/30 (2006.01)

(52) U.S. Cl.
CPC ............. *G06Q 10/02* (2013.01); *G07F 17/30* (2013.01)

(58) Field of Classification Search
CPC ........ G06Q 10/02; G06Q 50/01; G06Q 30/06; G06Q 20/045; G06Q 20/0457
See application file for complete search history.

(56) References Cited

U.S. PATENT DOCUMENTS

| 8,126,748 B2 | 2/2012 | Sunshine et al. | |
| 2005/0004820 A1* | 1/2005 | LeMieux | G06Q 10/02 705/5 |
| 2008/0188308 A1† | 8/2008 | Shepherd | |
| 2008/0281644 A1 | 11/2008 | Payne | |
| 2009/0256839 A1* | 10/2009 | Bastian | G06Q 10/02 345/419 |
| 2011/0093340 A1 | 4/2011 | Kramer et al. | |
| 2012/0078667 A1† | 3/2012 | Denker | |
| 2013/0054278 A1† | 2/2013 | Sharp | |
| 2013/0268899 A1* | 10/2013 | Valentino | G06Q 10/02 715/852 |
| 2014/0129629 A1* | 5/2014 | Savir | H04L 67/26 709/204 |

\* cited by examiner
† cited by third party

*Primary Examiner* — George Chen
(74) *Attorney, Agent, or Firm* — Maschoff Brennan

(57) ABSTRACT

Methods and systems for improving seat selection at a venue are described. The methods and systems help users understand how good a view they will have of a performance or event and/or how enjoyable an experience they will have before they purchase a ticket. A user selects a seat and is able to access relevant traits of people who purchased seats proximate to the selected seat. Relevant traits include physical features such as height, weight, build, etc., and behavior information, such as how noisy or quiet the person is.

20 Claims, 3 Drawing Sheets

ENHANCED SEAT SELECTION

BACKGROUND

Field of the Invention

The present invention generally relates to providing a user with information regarding the quality of a seat at an event, such as a sports game, theater event, or concert.

Related Art

Although personal sales used to be the norm for ticketing, that is no longer the case. A large portion of event-goers now purchase tickets through ticketing websites. A difficulty with these purchases is the limitation on a user's ability to determine and select the quality and location of individual seats. Some conventional ticketing websites provide seating charts, but conventional seating charts still fail to provide important information that may be relevant to decision-making.

People want to know as much information as possible about a seat in a venue before they purchase a ticket for that seat. People often complain when they pay a significant amount of money for a ticket and then they have a bad experience because their view of the main viewing area (e.g., a field in the case of a baseball or football or a stage at a musical or theatrical performance) is poor or does not meet expectations. For example, seating charts fail to provide users with a full picture of the quality and location of their seats relative to other sites in the event venue and any obstructions blocking a person's view. Thus, there is a need for systems and methods that provide people with more information about a particular seat to avoid these types of situations or at least know about them before they pay a significant amount of money for a ticket.

Figure 1:
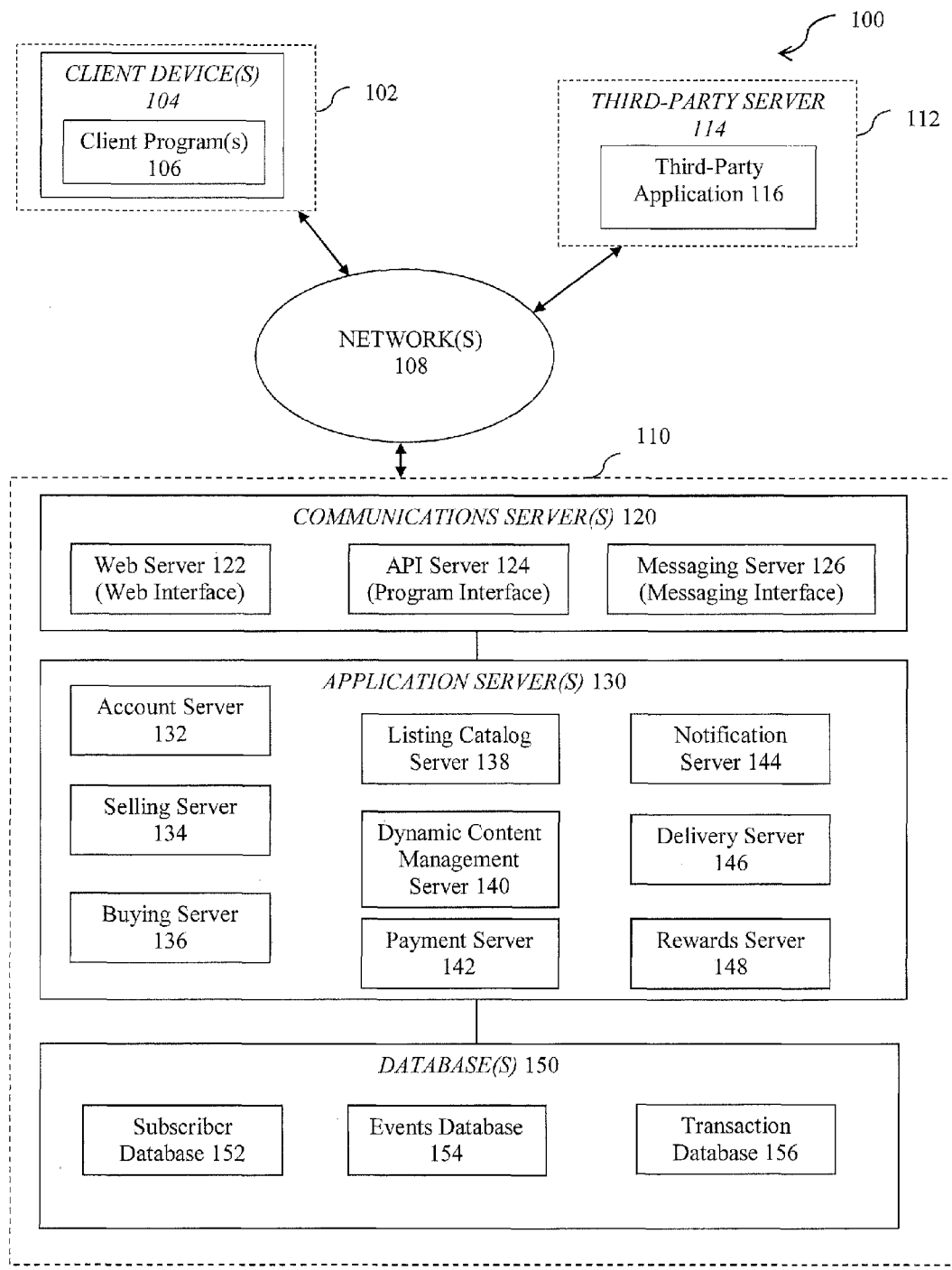
FIG. 1 is a is a block diagram of a networked system suitable for implementing the methods described herein according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes techniques for providing a user with more information about a particular seat at a venue. The methods and systems help users understand and predict how good a view they will have of a performance or event at a venue and/or how enjoyable an experience they will have before they purchase a ticket. For example, a user can be provided with pictures of the view taken by people who previously sat in the seat, taking the user's height into consideration. In another example, the user can access relevant traits of the people who purchased seats proximate to (e.g., around or near) the user's selected seat. Relevant traits can include physical features such as height, weight, build, etc., and behavior information, such as how noisy the person is.

If the person sitting in front of the user is determined to be much taller than the user, the user is informed of this obstruction and can locate and purchase another seat without an obstruction. If the people sitting adjacent to the user are determined to be noisy and the user prefers to be around quieter people, the user is able to find a seat surrounded by more peaceful people. Thus, the presence of people who may have a negative impact on the user's experience is detected before the user purchases a ticket.

In another embodiment, the presence of people who may have a positive impact on the user's experience is detected before the user purchases the ticket. For example, a person may be short (which can be an advantage for a user sitting behind that person), thin (which can be an advantage for a user sitting next to that person), more reserved, such as indicated by an older person, (which can be an advantage for a user who prefers a quieter surrounding experience), more vocal, such as indicated by a younger person, a known fan of a team playing at the event, etc., (which can be an advantage for a user who prefers a loud energetic experience), etc.

Beginning with FIG. 1, an exemplary embodiment of a computing system adapted for implementing one or more processes involving assisting a user at an event is illustrated in block diagram format. As shown, computing system 100 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

Computing system 100 can include, among various devices, servers, databases and other elements, a user 102 that may comprise or employ one or more user devices 104, such as a mobile computing device, a wearable computing device such as a smart watch or smart goggles, a PC, and/or any other computing device having computing and/or communications capabilities in accordance with the described embodiments. User devices 104 generally may provide one or more user programs 106, such as system programs and application programs to perform various computing and/or communications operations. Exemplary system programs may include, without limitation, an operating system (e.g., MICROSOFT® OS, UNIX® OS, LINUX® OS, Symbian OS™, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Exemplary application programs may include, without limitation, a web browser application, messaging applications (e.g., e-mail, IM, SMS, MMS, telephone, voicemail, VoIP, video messaging), contacts application, calendar application, electronic document application, database application, media application (e.g., music, video, television), location-based services (LBS) application (e.g., GPS, mapping, directions, point-ofinterest, locator), and so forth. One or more of user programs 106 may display various graphical user interfaces (GUIs) to present information to and/or receive information from one or more of user devices 104.

User device 104 may include one or more of a motion sensor, an image sensor (e.g. camera), a voice sensor (e.g. microphone), an optical sensor, and any other kind of device suitable to collect information from a user. Motion sensors such as motion detectors, accelerometers and/or gyroscopes may monitor speed, acceleration, position, rotation, and other characteristics of body and appendage motion. The motion sensor captures movement of a user, such as a pose, position, or gesture. Example gestures include for instance, an "air quote" gesture, a bowing gesture, a curtsey, a cheek-kiss, a finger or hand motion, a head bobble or movement, a high-five, a nod, a raised fist, a salute, a swiping or wave motion, a thumbs-up motion, a hand-moving-in-circle or hand waving gesture, or a finger pointing gesture. An image sensor captures images of the user and other objects. A voice sensor captures the voice or sounds made by the user. An optical sensor captures and characterizes light. Information captured by the sensors may be collected, stored, and associated with a specific user.

As shown, user 102 can be communicatively coupled via one or more networks 108 to a network-based system 110 managed by an online service provider, such as, for example, StubHub, Inc. of San Francisco, Calif. Network-based system 110 may be structured, arranged, and/or configured to allow user 102 to establish one or more communication sessions with network-based system 110 using various computing devices 104 and/or user programs 106. Accordingly, a communication session between user 102 and network-based system 110 may involve the unidirectional and/or bidirectional exchange of information and may occur over one or more types of networks 108 depending on the mode of communication. While the embodiment of FIG. 1 illustrates a computing system 100 deployed in a user-server operating environment, it is to be understood that other suitable operating environments and/or architectures may be used in accordance with the described embodiments.

Data and/or voice communications between user 102 and the network-based system 110 may be sent and received over one or more networks 108 such as the Internet, a WAN, a WWAN, a WLAN, a mobile telephone network, a landline telephone network, a VoIP network, as well as other suitable networks. For example, user 102 may communicate with network-based system 110 over the Internet or other suitable WAN by sending and or receiving information via interaction with a web site, e-mail, IM session, and/or video messaging session. Any of a wide variety of suitable communication types between user 102 and system 110 can take place, as will be readily appreciated.

In various embodiments, computing system 100 can include, among other elements, a third party 112, which may comprise or employ a third-party server 114 hosting a third-party application 116. In various implementations, third-party server 114 and/or third-party application 116 may host a web site associated with or employed by a third party 112. For example, third-party server 114 and/or third-party application 116 may enable network-based system 110 to provide user 102 with additional services and/or information, such as additional ticket inventory. In some embodiments, one or more of user programs 106 may be used to access network-based system 110 via third party 112. For example, user 102 may use a web user to access and/or receive content from network-based system 110 after initially communicating with a web site of third-party 112.

Network-based system 110 may comprise one or more communication servers 120 to provide suitable interfaces that enable communication using various modes of communication and/or via one or more networks 108. Communication servers 120 can include a web server 122, an API server 124, and/or a messaging server 126 to provide interfaces to one or more application servers 130. Application servers 130 of network-based system 110 may be structured, arranged, and/or configured to provide various online marketplace and/or ticket fulfillment services to users that access network-based system 110. In various embodiments, user 102 may communicate with application servers 130 of network-based system 110 via one or more of a web interface provided by web server 122, a programmatic interface provided by API server 124, and/or a messaging interface provided by messaging server 126. It can be appreciated that web server 122, API server 124, and messaging server 126 may be structured, arranged, and/or configured to communicate with various types of user devices 104 and/or user programs 106 and may interoperate with each other in some implementations.

Web server 122 may be arranged to communicate with web users and/or applications such as a web browser, web browser toolbar, desktop widget, mobile widget, web-based application, web-based interpreter, virtual machine, and so forth. API server 124 may be arranged to communicate with various user programs 106 and/or a third-party application 116 comprising an implementation of API for network-based system 110. Messaging server 126 may be arranged to communicate with various messaging users and/or applications such as e-mail, IM, SMS, MMS, telephone, VoIP, video messaging, and so forth, and messaging server 126 may provide a messaging interface to enable access by user 102 and/or third party 112 to the various services and functions provided by application servers 130.

When implemented as an online ticket marketplace, application servers 130 of network-based system 110 may provide various online marketplace and ticket fulfillment services including, for example, account services, buying services, selling services, listing catalog services, dynamic content management services, delivery services, payment services, and notification services. Application servers 130 may include an account server 132, a buying server 134, a selling server 136, a listing catalog server 138, a dynamic content management server 140, a payment server 142, a notification server 144, and/or a delivery server 146 structured and arranged to provide such online marketplace and ticket fulfillment services. Application servers 130 are adapted to receive a user's seat selection, retrieve pictures, display views from a selected seat, and display information regarding the people who purchased seats proximate the selected seat. The information includes for example, physical characteristics of the person such as build, height, weight, etc., and behavior information such as how a person acts or reacts during an event or performance.

Application servers 130 may be coupled to and capable of accessing one or more databases 150 including a subscriber database 152, an active events database 154, and/or a transaction database 156. Databases 150 generally may store and maintain various types of information for use by application servers 130 and may comprise or be implemented by various types of computer storage devices (e.g., servers, memory) and/or database structures (e.g., relational, object-oriented, hierarchical, dimensional, network) in accordance with the described embodiments.

Figure 2:
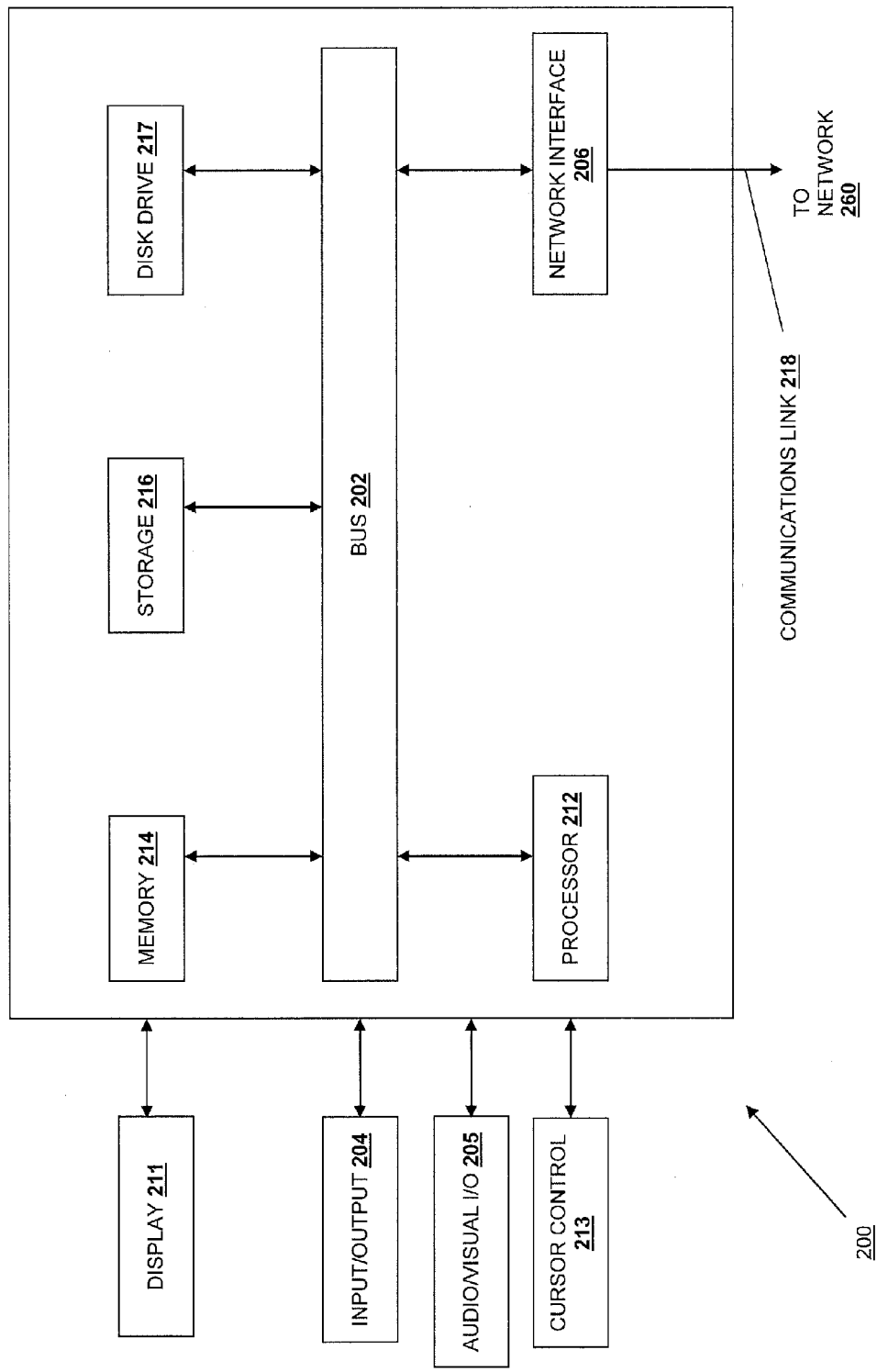
FIG. 2 is a block diagram of a computer system suitable for implementing one or more components in FIG. 1 according to one embodiment of the present disclosure.

Continuing with FIG. 2, an exemplary computer system 200 suitable for implementing one or more devices of the computing system in FIG. 1 is depicted in block diagram format. In various implementations, a device that includes computer system 200 may comprise a personal computing device (e.g., a smartphone, a computing tablet, a personal computer, laptop, PDA, Bluetooth device, key FOB, badge, etc.) that is capable of communicating with a network. The service provider may utilize a network computing device (e.g., a network server) capable of communicating with the network. It should be appreciated that each of the devices utilized by users and service providers may be implemented as computer system 200 in a manner as follows.

Computer system 200 can include a bus 202 or other communication mechanism for communicating information data, signals, and information between various components of computer system 200. Components include an input/output (I/O) component 204 that processes a user action, such as selecting keys from a keypad/keyboard, selecting one or more buttons or links, etc., and sends a corresponding signal to bus 202. I/O component 204 may also include an output component, such as a display 211 and a cursor control 213 (such as a keyboard, keypad, mouse, etc.). An optional audio input/output component 205 may also be included to allow a user to use voice for inputting information by converting audio signals. Audio I/O component 205 may allow the user to hear audio. A transceiver or network interface 206 transmits and receives signals between computer system 200 and other devices, such as another user device, a merchant server, or a payment provider server via a network. In one embodiment, the transmission is wireless, although other transmission mediums and methods may also be suitable. A processor 212, which can be a micro-controller, digital signal processor (DSP), or other processing component, processes these various signals, such as for display on computer system 200 or transmission to other devices over a network 260 via a communication link 218. Processor 212 may also control transmission of information, such as cookies or IP addresses, to other devices.

Components of computer system 200 also include a system memory component 214 (e.g., RAM), a static storage component 216 (e.g., ROM), and/or a disk drive 217. Computer system 200 performs specific operations by processor 212 and other components by executing one or more sequences of instructions contained in system memory component 214. Logic may be encoded in a computer readable medium, which may refer to any medium that participates in providing instructions to processor 212 for execution. Such a medium may take many forms, including but not limited to, non-volatile media, volatile media, and transmission media. In various implementations, non-volatile media includes optical or magnetic disks, volatile media includes dynamic memory, such as system memory component 214, and transmission media includes coaxial cables, copper wire, and fiber optics, including wires that comprise bus 202. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 200. In various other embodiments of the present disclosure, a plurality of computer systems 200 coupled by communication link 218 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

Figure 3:
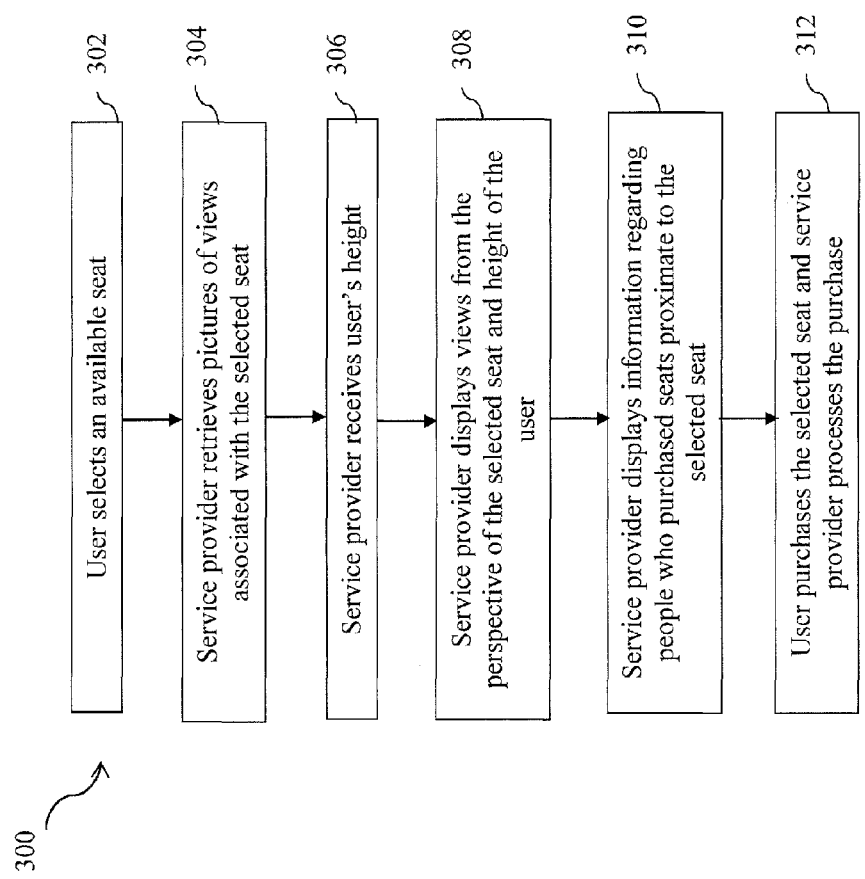
FIG. 3 is a flowchart showing a method of improving seat selection at a venue according to an embodiment of the present disclosure.

Referring now to FIG. 3, a flowchart of a method 300 for improving seat selection at a venue is illustrated according to an embodiment of the present disclosure. It should be appreciated that the method illustrated in the embodiment of FIG. 3 may be implemented by the systems illustrated in FIGS. 1 and/or 2 according to one or more embodiments.

In various embodiments, the user 102 registers with a service provider, which runs a mobile application. Registration may include signing up for the service and agreeing to any terms required by the service provider, such as through a user device. In one embodiment, the user device is a mobile computing device, such as a smart phone, a PC, or a computing tablet. In other embodiments, registration may be done completely through the user device, partially through the user device, or without using the user device, such as through a phone call or in-person visit to a representative of the service provider.

The user may be requested to provider specific information for registration, such as, but not limited to, a name, address, phone number, email address, picture, a user name for the account, and a password or PIN for the account. The type of information may depend on whether the user already has an account with the service provider. Requested information may be entered through the user device or other means, including voice or manual key entry. Once all the requested information is received and confirmed, the service provider may create an account for the user.

The method 300 begins at step 302, where the user 102 selects an available seat at a venue. For example, the user 102 may go to a ticketing website, select an event, and consider a seating chart that displays seats available for purchase at the event.

In various embodiments, the seating chart is interactive, and the system 110 enables the user 102 to select seats through a website. The system 110 may perform one or more of the following functions: present information about a plurality of upcoming performances; enable selection of at least one performance for possible attendance; search for available seats across one or more performances; provide a seating chart of a selected performance with seating information including current availability; enable selection of one or more seats from the seating chart; save (i.e., hold) the selected seat(s) for possible future purchase; remove the saved seat(s) from the inventory of currently available seating to prevent another person from purchasing same; enable purchase of the selected seats; transmit electronic communications to customers regarding seat selections or purchases; and provide the purchaser with the option of receiving electronic ticketing.

The seating chart rendering can be approximate, in that it need not be photo-realistic, but it may be designed to represent the actual venue. It can depict seat locations and physical structures, such as walls, floors, stage, or obstructions.

In some embodiments, system 110 may enable user 102 to bookmark one or more seats, performances, events, or venues. The bookmarks can then be associated with the user 102 within a user profile. At a later time, the user 102 may use the bookmark to link to the seats, performances, events, or venues that were marked. The user 102 may thus use the bookmark to check the availability of seats previously marked and, if desired, to purchase the seats if they are available.

For each event, events database 154 may maintain data indicating the status of some or all seats for each performance. The database 154 may store information about which seats are available for sale, which seats are on hold, and which seats are bookmarked for updates. The identification of a seat for a particular event may vary based on the event or the venue in which it is held. For example, if an event is general admission only, then the seat availability data may be implemented to keep track of the number of available seats, or the general sections of the seats, instead of identifying the specific location of each available seat. In contrast, if an event requires specific, reserved seats, then database 154 may track the status of each individual seat in the venue.

At step 304, the system 110 retrieves pictures of views associated with the user 102's seat selection. In various embodiments, pictures that were taken within a venue are saved in a database, such as database 154. The photos are associated with a particular seat within the venue, based on the ticket a person purchased and used to enter the venue. Image recognition and other methods can be used to determine which photos taken at the venue were those of the main viewing area (e.g., stage, basketball court, football field, etc.). For example, light can be analyzed to determine the brighter area of the photo because the side facing the main viewing area will be brighter. The direction of sounds can also be analyzed at the time the photograph was taken to determine if the photo was taken of the stage. In other examples, the system 110 can compare known pictures of the stage with pictures that were taken by people to determine if the images match. Beacons or other near-field communication (NFC) means can also be used to understand where in the venue the photo was taken, and embedded magnetometers present in most mobile devices can be used to provide the direction a user device was facing when the picture was taken. Pictures that are identified as those of the main viewing area are then stored in a database.

The images may include views from the perspective or viewpoint of a particular seat. The images may also include other seating information including the exact location of the seat, the distance of the seat to the stage or features of a field such as the home plate in baseball or the end zone in football, information regarding pole and wall obstructions, difficult viewing angles, walkway advisory information, information regarding whether obstructions block the view, information regarding in-field obstructions, large obstructed areas, obstructed area ratios (e.g., the area that is blocked from view by the obstruction divided by the total area of the field or main viewing area), the closest entrance, information regarding whether the seat is sheltered from rain, a zoom-in view of a seat in a seating section, ratings and/or reviews of the view and sound quality from the seat, comfort of the seat, and pictures of the seat.

In some embodiments, the photos in the database are associated with the height of the person who took the picture. Thus, the photos can also have "user height" information tagged with them. The person may input his or her height when the pictures are provided. In one embodiment, the system 110 is able to access the person's social network profile to determine the height of the person. For example, if the person has a profile on a dating website, the profile may include height information. In another embodiment, system 110 can access the user's clothing purchase history, such as through a fashion application. From the size and length of clothes bought, the system 110 can guess how tall the person is. For example, when buying pants for men, the length of the pants (e.g., 28L, 30L, 32L, 34L, etc.) must usually be specified. When a woman is buying pants, she must specify the inseam of the pants (e.g., short, regular, or long), and must also choose between buying petite (5'4" or shorter), regular, or tall (5'11" or taller).

In various embodiments, a beacon positioned on the ground or ceiling of the venue may be used to estimate a person's height. A beacon is a short range communication device having a known or fixed location that provides a signal that can be detected by mobile devices within a certain proximity of the beacon. An example of a beacon is a radio frequency (RF) beacon (e.g., Bluetooth™ low energy (BLE) beacon), infrared beacon or a radio frequency identifier (RFID) tag. For example, a BLE beacon can broadcast an RF signal that includes its position coordinates (e.g., latitude, longitude). Mobile devices are able to detect the signal when they are within range of the beacon. The mobile devices can estimate their location (e.g., with respect to a beacon located on the ceiling or ground) very precisely, as well as communicate with the beacon to exchange information. This location information can be used to estimate the height of the person.

For example, when a person is holding a mobile device to take a picture at a venue, the mobile device communicates with a beacon on the ceiling or the ground and determines how close the device is to the beacon. In one embodiment, the beacon is on the ceiling, and the service provider determines the distance of the beacon to the ground and then works backwards to calculate the user's height. In another embodiment, the beacon is on the ground, and the measurement from the ground to the mobile device provides an estimate of the user's height.

At step 306, the system 110 receives the user 102's height. In one embodiment, the user 102 inputs his or her height upon logging into the ticketing website. In another embodiment, the user 102 may have previously submitted pictures, and the height of the user 102 may already be known.

At step 308, the system 110 displays views of the main viewing area from the perspective of the selected seat and the height of the user 102. In various embodiments, the system 110 retrieves pictures from database 154 for the selected seat that were taken by a person having the same height or substantially the same height (e.g., 1 or 2 inch difference). In other embodiments, the system 110 retrieves the pictures and visually adjusts the picture upwards or downwards to correspond to the user 102's height. For example, assume the user 102 is 5'7". A picture that was taken by someone who is 5'11" is adjusted downward to account for the 4 inch difference so that the user 102 can understand what kind of view someone who is his or her height would have of the main viewing area.

At step 310, the system 110 further displays information regarding the people who purchased seats proximate to (e.g., next to, in front of, or in back of) the selected seat. For example, the system 110 displays traits of people who purchased seats around or near (e.g., one or two seats away) the selected seat. Such traits may include physical characteristics of the person(s), such as height, weight, or build. The height of the person(s) may be determined in accordance with the discussion above. The height may be provided in number format (e.g., 5'5") or may be a more general description (e.g., short, tall, petite, average). Weight and build may be deduced, for example, from the person's clothing purchase history, based on the size of the clothes bought. Weight and build characteristics may be described using terms such as plump, stocky, overweight, fat, slim, trim, skinny, buff, well built, etc.

If any of these traits are unfavorable or favorable for the user 102, the system 110 can display an outline of the person on the purchased seat or provide some other kind of visual display or warning to alert the user 102. For example, if a person with a seat directly in front of user 102 is 6'2" and the user 102 is only 5'2", a tall dotted outline may appear where the person will sit to notify the user 102 that his or her view may be obstructed. Similarly, if a person that weighs 300 pounds and has the build of a football player has bought a seat adjacent to the selected seat, a warning may pop up on the purchased seat. In another embodiment, the user 102 is notified that the person sitting in front of the selected seat is shorter than him or her so that the view is not blocked, or that a person sitting next to the selected seat has a small build and weight.

The picture data provided to the user 102 can be used in conjunction with the heights of people who have already purchased tickets to the event to help the user 102 determine how his or her view of the main viewing area would look. In various embodiments, when a ticket is purchased, the assigned seat ticket will contain tagged information including a person's height. Thus, when subsequent tickets are purchased, people will be able to ensure that they are sitting or standing behind a shorter person (or someone similar in height) to have an unobstructed view of the main viewing area. If the tickets are to a general admission show, a projection can be made to the average height of the audience who has currently purchased tickets, as well as projections based on the historical height of the audience based on that artist and venue.

The traits may also include behavior information of the person(s) who has already purchased a seat. Behavior information includes making a lot of noise, dancing, singing, chanting, making hand motions, shouting, being quiet, remaining calm, silent, or still, etc. This behavior information can be obtained, for example, by a sensor or multiple sensors coupled to a mobile device of the person(s) during a previous event or performance, a mobile device of other people at the event or performance, and/or equipment at the venue and inputting those activities in a database. The behavior information can be collected and then associated with the person(s) in the database and with a specific event, performance, or artist. For example, a person's noisy behavior may only be associated with music concerts and sports events, but not theater or opera productions. In the category of music concerts, the person may be singing and dancing when the artist is Pink, Justin Timberlake, or The Black Eyed Peas, but the person is quiet when the artist is Adele, Cher, or Britney Spears. Thus, the presence of a loud or rowdy person can be identified before the user 102 buys the ticket, and the user 102 can avoid sitting near the person or select sitting near the person (e.g., if the user 102 prefers to sit near a more energetic person).

For example, the user 102 may be browsing seats for a Kelly Clarkson concert, and selects a seat near the front. The system 110 notifies the user 102 that a person that sings during Kelly Clarkson concerts has purchased a seat near the front. The user 102 decides to find another seat, closer to the middle. The system 110 determines that a person who likes to dance during Lady Gaga concerts has purchased a seat adjacent to the selected seat. The user 102 purchases the seat because he or she believes that the person will probably not dance during the Kelly Clarkson concert, if the user 102 is not bothered by dancing, or if the user 102 wants the dancing.

In another example, the user 102 decides to attend the U.S. Open, and selects a seat closer to the back of the stadium. The system 110 informs the user 102 that the seat in front of the selected seat has been purchased by someone shorter than the user 102. In addition, the seat in back of the selected seat has been purchased by someone who does not get too excited or make a lot of noise during tennis matches. The user 102 determines that the selected seat is ideal for someone like him or her (i.e., someone who prefers a quiet experience).

At step 312, the user 102 decides to purchase the ticket for the selected seat, and the purchase is processed. Alternatively, the user 102 may choose to search for another available seat if he or she decides that the people surrounding the selected seat will negatively affect his or her enjoyment of the event or performance.

EXAMPLES

Particular examples will now be described. The first example describes gathering information about stage views at a show.

Steve purchases a ticket to see John Legend at Bass Concert Hall through his ticket mobile application or "app." Steve arrives at the venue, has his ticket scanned, and goes to his assigned seat. He takes pictures with his phone as the concert progressed, and posts pictures to his social networking accounts. Steve had previously set up his fashion app and ticket app to share information between each other, and had previously used the fashion app to purchase clothing. Steve had also previously provided his height to the fashion app. When the ticket app makes a service call to the fashion app to retrieve Steve's height information, all of Steve's photos are embedded with information about his height.

Since the pictures were taken on Steve's phone, the ticket app has permission to use the pictures Steve posted as reference photos. The reference photos contain Steve's specific seat as well as his height. The reference photos are analyzed to determine if they are facing the stage. Reference photos that are facing the stage are saved. Steve loves the Bass Concert Hall venue so he buys a ticket to see Norah Jones, one row down from his seat at the John Legend show.

This next example builds on the first example, and further illustrates the use of picture information to help prospective ticket buyers.

Michelle uses her ticket app to buy tickets to a Norah Jones concert at the Bass Concert Hall. Michelle sees pictures that show views of the stage from each of the available seats. Michelle inputs her height into the ticket app prior to searching for seats, and spots an open ticket behind an occupied seat. Michelle clicked on the open ticket spot to see her view of the stage. It turns out Michelle's seat is the seat Steve had for the John Legend show, so the seat itself has a good view of the stage. The pictures Michelle sees are from concert goers who have a similar height as Michelle. She also sees Steve's pictures, but they are visually adjusted downward to adjust for her height since she is shorter than Steve.

Michelle's selected seat, however, is behind the seat that was purchased by Steve. When Steve purchased his ticket to the Norah Jones show through his ticket app, his height information was also included with the purchase. In this way, the ticket service is able to understand the height of each concert goer and help subsequent customers find a good seat. Michelle sees a dotted outline (or some other user interface cue) of the projected taller person (in this case Steve) in her view of the stage.

Michelle decides that there are better seats available so she choose a different seat that has an unobstructed view and makes the purchase with her ticket app. Michelle now has a better concert going experience because she was able to understand exactly how her view of the stage would look prior to purchase. She knew about the obstruction based on the height of people who had purchased tickets.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Various changes and modifications may be practiced, and it is understood that the invention is not to be limited by the foregoing details, but rather is to be defined by the scope of the claims.

What is claimed is:

1. A system, comprising:
a memory configured to store image data; and
one or more processors in communication with the memory and configured to:
receive a picture taken by a first user device of a first user at a venue;
perform image recognition to determine the picture includes a viewing area of the venue;
determine a first seat from which the picture is taken and a height of the first user;
store the picture associated with the first seat and the height of the first user in the memory as a part of the image data;
receive a seat selection from a second user device of a second user corresponding to the first seat;
determine a height of the second user;
retrieve the picture from the memory based on determining the height of the first user and the height of the second user is within a first difference, or retrieve the picture from the memory and visually adjust the picture based on a difference between the height of the first user and the height of the second user exceeding the first difference;
determine a height of a third user who purchased a ticket for a second seat in front of the first seat towards the viewing area for an event;
visually project an outline of a person on the picture based on the height of the third user; and
present the outline-projected picture on the second user device.

2. The system of claim 1, wherein the one or more processors are configured to further provide to the second user device information regarding at least one user who purchased a ticket proximate to the first seat, wherein the information comprises physical characteristics, behavior information, or a combination thereof.

3. The system of claim 2, wherein the physical characteristics comprises height, weight, build, or a combination thereof.

4. The system of claim 2, wherein the one or more processors are configured to further display on the second user device the physical characteristics of the at least one user.

5. The system of claim 2, wherein the behavior information is associated with a particular event, performance, or artist.

6. The system of claim 2, wherein the behavior information comprises making noise, dancing, singing, chanting, making hand motions, shouting, being quiet, remaining calm, or a combination thereof.

7. The system of claim 1, wherein the one or more processors are configured to further determine the height of the second user based on the second user inputting the height of the second user on a service provider website or based on a picture including the second user.

8. The system of claim 1, wherein the one or more processors are configured to further display on the second user device views of the viewing area from a perspective of the first seat and the height of the second user, and wherein the views comprise the outline-projected picture.

9. A method, comprising:
receiving a picture taken by a first user device of a first user at a venue;
performing image recognition to determine the picture includes a viewing area of the venue;
determining a first seat from which the picture is taken and a height of the first user;
associating the picture with the first seat and the height of the first user;
receiving a seat selection from a second user device of a second user corresponding to the first seat for an event at a venue;
determining a height of the second user;
retrieving the picture based on determining the height of the first user and the height of the second user is within a first difference, or retrieving the picture and visually adjusting the picture based on a difference between the height of the first user and the height of the second user exceeding the first difference;

determining a height of a third user who purchased a ticket for a second seat in front of the first seat towards the viewing area for the event;

visually projecting an outline of a person on the picture based on the height of the third user; and presenting the outline-projected picture to the second user on the second user device.

10. The method of claim 9, further comprising providing to the second user device information regarding at least one user who purchased a ticket proximate to the first seat, wherein the information comprises physical characteristics, behavior information, or a combination thereof.

11. The method of claim 10, wherein the physical characteristics comprises height, weight, build, or a combination thereof.

12. The method of claim 10, wherein the behavior information is associated with a particular event, performance, or artist.

13. The method of claim 10, wherein the behavior information comprises making noise, dancing, singing, chanting, making hand motions, shouting, being quiet, remaining calm, or a combination thereof.

14. The method of claim 9, wherein the presenting comprises displaying on the second user device views of the viewing area from a perspective of the first seat and the height of the second user, and wherein the views comprise the outline-projected picture.

15. A non-transitory machine-readable medium having stored thereon machine-readable instructions executable to cause a machine to perform operations comprising:

receiving a picture taken by a first user device of a first user at a venue;

performing image recognition to determine the picture includes a viewing area of the venue;

determining a first seat from which the picture is taken and a height of the first user;

associating the picture with the first seat and the height of the first user;

receiving a seat selection from a second user device of a second user corresponding to the first seat for an event at a venue;

receiving a height of the second user;

retrieving the picture based on determining the height of the first user and the height of the second user is within a first difference, or retrieving the picture and visually adjusting the picture based on a difference between the height of the first user and the height of the second user exceeding the first difference;

receiving a height of a third user who purchased a ticket for a second seat in front of the first seat towards the viewing area for the event;

visually projecting an outline of a person on the picture based on the height of the third user; and presenting the outline-projected picture on the second user device.

16. The non-transitory machine-readable medium of claim 15, the operations further comprising providing to the second user device information regarding at least one user who purchased a ticket proximate to the first seat, wherein the information comprises physical characteristics, behavior information, or a combination thereof.

17. The non-transitory machine-readable medium of claim 16, wherein the physical characteristics comprises height, weight, build, or a combination thereof.

18. The non-transitory machine-readable medium of claim 16, wherein the behavior information is associated with a particular event, performance, or artist.

19. The non-transitory machine-readable medium of claim 16, wherein the behavior information comprises making noise, dancing, singing, chanting, making hand motions, shouting, being quiet, remaining calm, or a combination thereof.

20. The non-transitory machine-readable medium of claim 15, wherein the presenting comprises displaying on the second user device views of the viewing area from a perspective of the first seat and the height of the second user, and wherein the views comprise the outline-projected picture.

* * * * *